United States Patent
Rippel et al.

(10) Patent No.: US 10,348,114 B2
(45) Date of Patent: Jul. 9, 2019

(54) PORTABLE ELECTRICAL ENERGY STORAGE AND POWER PROCESSING DEVICE

(71) Applicant: Whisper Energy Systems Inc., Sherman Oaks, CA (US)

(72) Inventors: Wally E. Rippel, Sherman Oaks, CA (US); Michael Gould, Sherman Oaks, CA (US); Brian Jensen, Sherman Oaks, CA (US)

(73) Assignee: WHISPER ENERGY SYSTEMS INC., Sherman Oaks, CA (US)

( * ) Notice: Subject to any disclaimer, the term of this patent is extended or adjusted under 35 U.S.C. 154(b) by 630 days.

(21) Appl. No.: 14/624,510

(22) Filed: Feb. 17, 2015

(65) Prior Publication Data
US 2015/0288209 A1 Oct. 8, 2015

Related U.S. Application Data

(60) Provisional application No. 61/976,757, filed on Apr. 8, 2014.

(51) Int. Cl.
*H02J 7/00* (2006.01)

(52) U.S. Cl.
CPC .......... *H02J 7/0065* (2013.01); *H02J 7/0055* (2013.01); *H02J 7/0047* (2013.01); *H02J 2007/0059* (2013.01)

(58) Field of Classification Search
None
See application file for complete search history.

(56) References Cited

U.S. PATENT DOCUMENTS

| | | | |
|---|---|---|---|
| 7,550,861 B2 * | 6/2009 | Oyobe | B60L 1/006 123/1 A |
| 2006/0198169 A1 * | 9/2006 | Tsai | H02J 9/062 363/34 |
| 2007/0019453 A1 * | 1/2007 | Pierce | H01M 2/10 363/107 |
| 2007/0085422 A1 * | 4/2007 | Iida | H02J 7/0045 307/64 |
| 2008/0169651 A1 * | 7/2008 | Oyobe | B60L 1/006 290/7 |
| 2012/0038167 A1 * | 2/2012 | Kjaer | H02M 1/12 290/55 |
| 2012/0043935 A1 | 2/2012 | Dyer et al. | |
| 2015/0303731 A1 * | 10/2015 | Takahashi | H02J 3/32 320/127 |

* cited by examiner

*Primary Examiner* — Robert J Grant
*Assistant Examiner* — Tynese V McDaniel
(74) *Attorney, Agent, or Firm* — Sheppard Mullin Richter & Hampton LLP (57) ABSTRACT

A portable power unit is provided that can be embodied in backpack, waist-pack, or other portable form. The portable power unit can include a battery, a bidirectional power processor, and a power port. The bidirectional power processor allows for direct current (DC) power exchange between the battery and the bidirectional power processor and a user selectable alternating current (AC) or DC power exchange between the bidirectional power processor and a power port through which a power source and an external load can be connected for charging and discharging of the electrochemical battery, respectively.

19 Claims, 6 Drawing Sheets

PORTABLE ELECTRICAL ENERGY STORAGE AND POWER PROCESSING DEVICE

CROSS-REFERENCE TO RELATED APPLICATIONS

This application claims the benefit of U.S. Provisional Patent Application No. 61/976,757 filed Apr. 8, 2014, which is incorporated herein by reference in its entirety.

TECHNICAL FIELD

The present disclosure is generally related to portable power sources. In particular, the present disclosure provides a portable battery for powering alternating current (AC) as well as direct current (DC) devices that can be recharged from AC and DC power sources.

BACKGROUND

Conventionally, corded tools, such as electrical drills, rotary saws, garden tools etc., have been constrained in terms of portability as they are reliant upon a nearby power source, e.g., an AC power plug or wall socket. However, due in part to the development of more powerful rechargeable batteries, such as those with a lithium-ion chemistry, battery-powered counterparts to such tools have gained popularity in recent years. Likewise, the use and popularity of battery-powered garden tools such as hedgers, lawn mowers, and leaf blowers has also grown.

Compared to their corded counterparts, battery-powered garden tools do not require the use of oftentimes long and cumbersome extension cords for connecting to a power source. However, users of battery-powered garden tools, e.g., landscapers, must endure the inconvenience of a limited power source, as well as limited use per charge and having to recharge such battery-powered garden tools. Additional disadvantages include the inability to use a battery-powered garden tool while the battery is charging and the dollar cost associated with the battery and the battery charger. Moreover, there is added fatigue associated with having to handle the added weight of a battery pack in a battery-powered tool.

One way in which the above-mentioned disadvantages can be minimized is by utilizing a single, relatively large battery that is packaged or configured for use as a backpack or waist-pack to power the tool. With this approach, corded (AC powered) devices and battery-powered devices can be powered for increased periods to time (due to the greater capacity of larger batteries), while the "direct" weight of the battery-powered device is reduced due to removal of the original/integrated battery. In most cases, the human fatigue factor associated with carrying a backpack or waist-pack is significantly less when compared to supporting the mass of a tool and the included battery pack with, e.g., extended arms. For devices such as hedge trimmers, drills, and power saws (both rotary and chain), transferring mass to a backpack or waist-pack makes handling and manipulating the tool much easier.

SUMMARY

In accordance with one embodiment, a portable power unit comprises an electrochemical battery and a bidirectional power processor. The bidirectional power processor is configured to provide DC power exchange between the electrochemical battery and the bidirectional power processor and user selectable AC or DC power exchange between the bidirectional power processor and a power port through which a power source and an external load can be connected for charging and discharging of the electrochemical battery, respectively.

In another embodiment, a portable power unit comprises an electrochemical battery and a bidirectional power processor. The bidirectional power processor is configured to provide DC power exchange between the electrochemical battery and the bidirectional power processor and a user selectable AC or DC power exchange between the bidirectional power processor and at least two separate power ports. The bidirectional power processor comprises a controller and a plurality of switching poles, each connected in parallel with the electrochemical battery. The at least two separate power ports comprise a first power port providing connections through which a power source or a first external load can be connected for charging and discharging of the electrochemical battery, respectively, and a second power port providing connections through which a second external load can be connected.

In a further embodiment, a portable power unit comprises an electrochemical battery and a bidirectional power processor. The bidirectional power processor is configured to provide DC power exchange between the electrochemical battery and the bidirectional power processor and a user selectable AC or DC power exchange between the bidirectional power processor and at least three separate power ports. The bidirectional power processor comprises a controller and a plurality of switching poles, each connected in parallel with the electrochemical battery. The at least three separate power ports comprise a first power port providing connections through which a power source or a first external load can be connected for charging and discharging of the electrochemical battery, respectively, a second power port providing connections through which a second external load can be connected, and a third power port providing connections through which the electrochemical battery can be charged simultaneously with providing power to at least one of the first external load and the second external load.

BRIEF DESCRIPTION OF THE DRAWINGS

Further aspects of the present disclosure will be more readily appreciated upon review of the detailed description of its various embodiments, described below, when taken in conjunction with the accompanying drawings.

DETAILED DESCRIPTION

The details of some example embodiments of the methods and systems of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

As set forth above, the fatigue associated with carrying weight in a backpack or waist-pack is less than holding that weight in one's arms. For example, shouldering a fifteen pound backpack is oftentimes far less fatiguing than carrying a hand-held appliance weighing just a few pounds. A backpack or waist-pack styled battery/power source also has the advantage of being able to power a number of AC and DC devices with just a single battery. This can reduce cost as the total investment associated with purchasing a single battery with built in charger that can be utilized for multiple devices is much less when compared to the cost of purchasing batteries and/or chargers for each device. Additionally, a portable power unit having the flexibility of being recharged from a variety of sources and providing power to a variety of devices, be it tools, mobile devices, etc., can be very useful for emergency preparedness/emergency situations. However, batteries which supply DC power cannot drive/power many devices which are designed to operate using AC power, e.g., 60 Hz, 115VAC power (115 volts (V) of AC power generated at a frequency of 60 Hz).

Accordingly, various embodiments described in the present disclosure provide a portable power unit that can be configured for use in or as part of a backpack, waist-pack, or other portable carrier. The portable power unit is able to supply both DC power and AC power to a plurality of different devices or tools. Moreover, the portable power unit can be recharged from a variety of sources, whether the sources supply AC or DC power. Still other embodiments described in the present disclosure provide a portable power unit that can be utilized to charge other devices, such as cellular phones, laptop computers, etc., or that can be utilized in simultaneous charge/discharge scenarios. It should be noted that the features and/or applicable circuit/logic design associated with such features discussed in accordance with various embodiments may be combined in any number of ways to achieve a portable power unit having configurable capabilities/features.

In accordance with one embodiment, a low-cost and lightweight (non-isolated) bidirectional inverter/power processor is co-packaged with a battery as part of the portable power unit. The bidirectional inverter/power processor allows for DC power exchanges between the battery and a power port, and either AC or DC power exchanges between the bidirectional inverter/power processor and the power port. The topology or circuit design of the bidirectional inverter/power processor used for changing between DC power and AC power (e.g., to allow the battery to produce AC power) is configured such that the nominal or reference voltage of the battery can be, e.g., under 50V. This can simplify addressing certain safety issues. Because the inverter/power processor is bidirectional, the same circuitry can be used to recharge the battery from a standard power source, e.g., 115VAC utility outlet. It should be noted that no transformer is needed in accordance with various embodiments. It should be further noted that various embodiments can be adapted for use with differing battery sources (e.g., batteries of differing nominal voltages, capacities, etc. as well as differing power sources, e.g., the aforementioned 60 Hz, 115 (or 120) VAC utility outlets utilized in the United States, 50 Hz, 220/230 VAC utility outlets in Europe, differing operational characteristics, etc. Accordingly, values associated with receipt and/or delivery of power provided in the context of various embodiments disclosed herein, are examples only, and not meant to be limiting in any way.

Further still, the same bidirectional inverter/power processor can also be used to supply DC power over a wide range of selected voltages. The ability to supply DC power in such a manner enables the portable power unit to not only power conventional AC devices, appliances, or tools, but to also power devices which are designed to operate using DC power. Moreover, and as described above, another advantage realized with various embodiments is the ability to recharge the portable power unit using/from a variety of DC sources such as an automotive 12V DC socket, or aircraft 28V systems.

Figure 1:
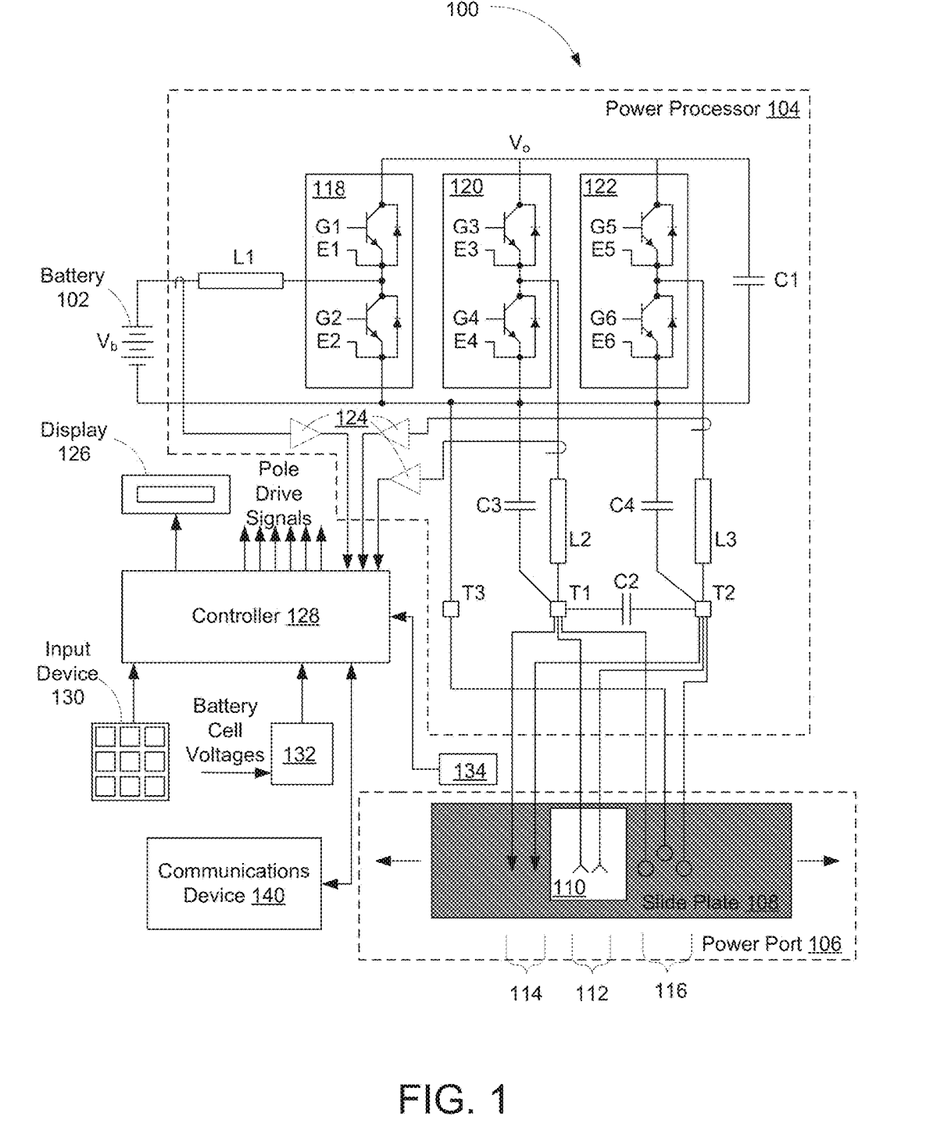
FIG. 1 illustrates an example circuit diagram for implementing a portable power unit in accordance with various embodiments.

FIG. 1 illustrates a circuit diagram of an example portable power unit 100 in accordance with one embodiment of the present disclosure. Portable power unit 100 may include a battery 102 having a nominal voltage $V_b$ (which as described previously can be under 50V). Battery 102 may be any type of battery/power source appropriate for powering one or more desired devices, appliances, tools, etc., including, for example, but not limited to a cordless hedger, lawn mower, or leaf blower. Battery 102 may be an electrochemical battery, such as a lithium-ion battery, a nickel metal hydride battery, or other rechargeable-type battery.

Connected to battery 102 is a power processor 104 for receiving and allocating power to and from battery 104 and one or more devices (or power source) connected to portable power unit 100 via a power port 106. Power processor 104 may include three power/switching poles 118, 120, and 122, each including an upper and lower switch. Each switch may include a transistor in parallel with a flyback or snubber diode. It should be noted that the semiconductor switches are illustrated in FIG. 1 as bi-polar junction transistors (BJTs), but can be, e.g., a metal oxide semiconductor field-effect transistor (MOSFET) or an insulated-gate bipolar transistor (IGBT), etc. Each of the three power poles 118, 120, and 122 are connected in parallel with battery 102 and a first capacitor C1 (which also connects in parallel with battery 102). It should be noted that as will be described in greater detail below with reference to FIGS. 4A and 4B, an additional power pole(s) may be implemented in a power processor. It should be further noted that battery 104 can comprise one or more separate cells.

Power pole 118 may act as a bidirectional buck/boost converter, while power poles 120 and 122 can make up an H-bridge inverter. Power pole 118 allows portable power unit 100 to handle bidirectional power flow. In this example, bidirectional power flow would include the flow of power from battery 102 to a device operatively connected to power port 106 in a discharge mode, and the flow of power from power port 106 to battery 102 in a charge mode.

For example, in discharge mode, power pole 118 may be used to boost battery voltage to a level higher allowing current to flow from the battery, while power poles 120 and 122, acting as an inverter, may be used to convert the DC voltage from the battery into AC voltage. That is, when supplying power to an external load (device), power pole 118 serves to boost the voltage of battery 104 $V_b$ from, e.g., 48V to approximately 200 VDC ($V_o$), for example. Power poles 120 and 122 operate in buck mode and convert power from the Vo bus such that the voltage difference between the phase nodes of power poles 120 and 122 (ultimately connecting to first and second terminals T1 and T2 of power port 106) is regulated to a desired value (e.g., 60 Hz, 115 VAC).

When receiving recharge power, power poles 120 and 122 operate as a synchronous boost mode rectifier. $V_o$ is maintained at a desired voltage, e.g., 200VDC, (where control of $V_o$ can be such that unity power factor is maintained). Power pole 118 may then operate in buck mode, and reduce the 200V bus voltage to the battery voltage such that the desired power flow is maintained.

Figure 2:
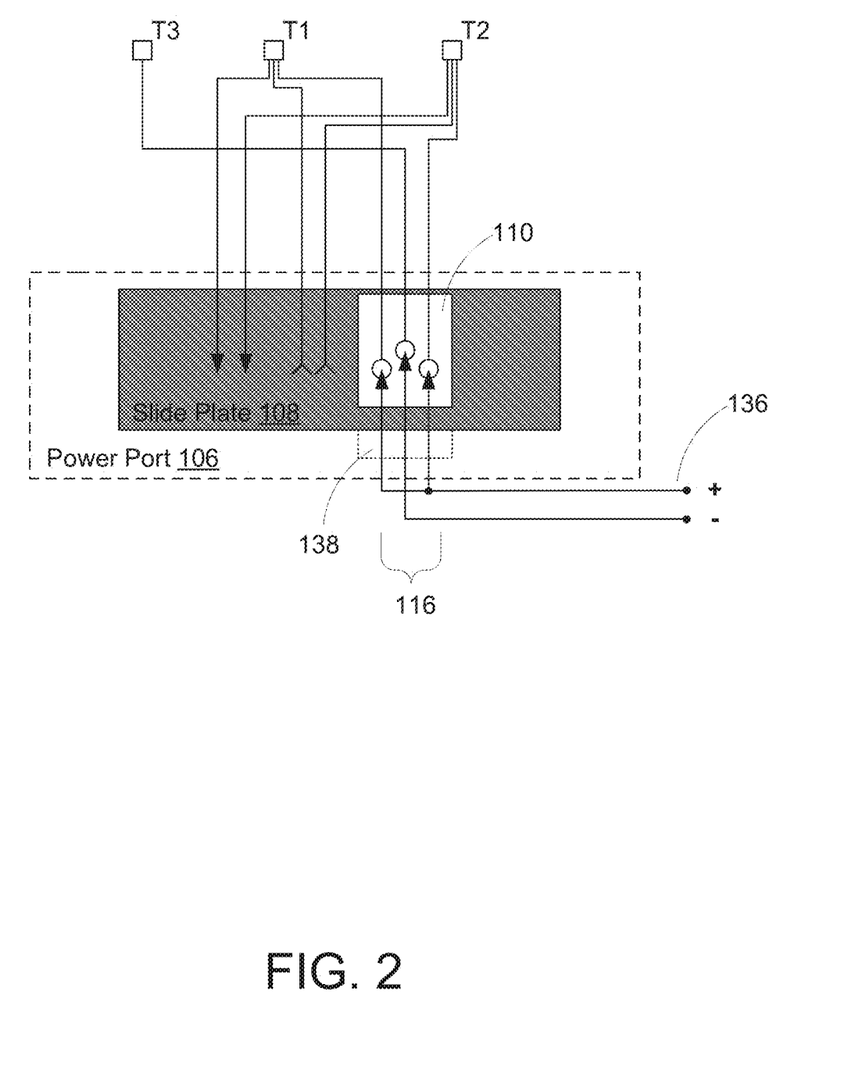
FIG. 2 illustrates an example circuit diagram for configuring a DC power connection in accordance with various embodiments.

DC power can be sinked or sourced via terminals T1 and T2 where an appropriate control algorithm can be employed. In this case, maximum DC current can be limited to approximately the AC root-mean-square (rms) current limit which is based on the thermal limits of power poles 120 and 122. However, by using terminal T3 as the current return and by shorting terminal T1 to terminal T2 (as shown in FIG. 2), the DC current limit can be doubled (for both discharge and recharge) as long as power pole 118 currents are not exceeded (which is illustrated in FIG. 2 and will be discussed below). This shorting can be accomplished through a special shorting connector that plugs into DC connector pin set 116 (discussed in greater detail below). Thus, for a system capable of supplying, e.g., 10 A at 115VAC, up to 20 A of DC can be supplied (or absorbed during recharge) for DC voltages up to 50V (or larger if higher voltage battery is used).

In accordance with one embodiment, the DC portion 116 of power port 106 can be used to source and sink DC power simultaneously by not shorting terminals T1 and T2. One example scenario in which this can be useful is where portable power unit 100 can be charged from a 12V source through terminals T2 and T3 and portable power unit 100 can deliver 24V from terminals T1 and T3. This simultaneous power in and out of DC connector pins 116 can be fed through a special plug that splits these pins into two separate connectors.

Power processor 104 further includes a first inductor L1 connected to a first side of battery 102 and a phase node of power pole 118. A second inductor L2 connects the phase node of power pole 120 and first terminal T1 of power port 106. A third inductor L3 connects the phase node of power pole 122 and second terminal T2 of power port 106. A second capacitor C2 is connected between first and second terminals T1 and T2 of power port 106. A third capacitor C3 connects a second side of battery 102 with first terminal T1 of power port 106, and a fourth capacitor C4 connects the second side of battery 102 with second terminal T2 of power port 106. Furthermore, power port 106 may include a third terminal T3 that connects directly to the second side of battery 102.

Power port 106 may include a set of two female connector pins 112 which connect respectively, to the first and second terminals T1 and T2 of power port 106, and serve as an AC power outlet for external loads. Power port 106 may further include a set of two male connector pins 114 which connect respectively, to the first and second terminals T1 and T2 of power port 106, and serve as a power plug for receiving AC utility power. Additionally still, power port 106 may include a set of three connector pins 116, which are different from connector pin sets 112 and 114, e.g., DC bidirectional pins, which connect respectively, to each of terminals T1, T2, and T3 of power port 106. It should be noted that a three pin connector can mate with connector pin set 116, where the first and second mating pins are connected. It should be further noted that although various embodiments are described in the context of utilizing three sets of connector pins (to, e.g., meet existing or contemplated safety requirements), the functionality of various embodiments described herein may be achieved through the use of, e.g., two or even one set of connector pins rather than the aforementioned three sets of connector pins As also illustrated in FIG. 1, power port 106 may include a moving cover/slide plate 108 which, depending on its position relative to connector pin sets 112, 114, or 116, exposes one of the connector pin sets 112, 114, or 116 at a given moment such that one mating connector can be mated to/with power port 106 at a time. An opening 110 may be integrated or provided in moving cover plate 108 to access any one of connector pin sets 112, 114, and 116. It should be noted that the use of a moving cover or slide plate is optional in accordance with various embodiments. That is, if desired, power port 106 may be exposed. At least one sensor 134, e.g., a position sensor, may be utilized to detect the position of moving cover plate 108 to determine whether portable power unit 100 should be in: (a) discharge mode, i.e., powering an external load, either with AC power (via connector pin set 112) or DC power (via connector pin set 116); or (b) charge mode, i.e., receiving power to recharge battery 102, either with AC power (via connector pin set 114) or DC power (via connector pin set 116). Upon determining the desired operating mode of power port 106, sensor 134 can provide information to controller 128, which can then issue command signals to power processor 104 to achieve the desired operating mode via pole drive signals.

A voltage-regulated sine wave may be applied to terminals T1 and T2 of power port 106 when the slide plate exposes connector pin set 112, when the user requests AC voltage through input device (or display), or when a plug is mated with connector pin set 112. A recharge current can be applied to the terminals/sides of battery 102 when AC utility power is applied to terminals T1 and T2 of power port 106 when a socket connector is mated to connector pin set 114. A regulated DC voltage can be applied to terminals T1 and T3 of power port 106 when an appropriate plug is mated to connector pin set 116. DC charging desired can be sensed by the voltage present at pin set 116 by controller 128. In the case of DC recharging, a recharge current can be applied to battery 102 when DC power is applied to terminals T1 and T3 of power port 106 when an appropriate connector is mated to connector pin set 116. It should be noted that currents at power port 106 are limited by power processor 104, and current at power port 106 may be a sine wave which is in phase with the applied utility voltage. Current sensing can be accomplished via current sensors 124 connected between power processor 104 and controller 128, and may, for example, be utilized to assist in protecting against overload conditions thereby protecting power processor 104, battery 102, and the load, as well as providing charge status of battery 102, providing control feedback, etc.

Portable power unit 100 may also include a battery management circuit 132 which controls power processor 104 such that no cell within battery 102 is charged to a voltage which exceeds a selected threshold. Battery management circuit 132 may further control power processor 104 such that no cell within battery 102 is discharged to a voltage below a selected threshold, as well as balance each cell, and protect battery 102 from exceeding a temperature threshold(s). If battery management circuit 132 senses any parameter exceeding a threshold, it may tell the power processor 104 to reduce or cut off power to or from power port 106.

Portable power unit 100 may include a display 126, such as a liquid crystal display (LCD) or other display which connects to power processor 104 and which may be used to display, present, or otherwise provide a user with one or more of the following types of information including, but not limited to battery charge state, battery heath state, operational mode, voltage of power port 106, current at power port 106, AC frequency at power port 106, and fault diagnostics.

Portable power unit 100 may further include one or more input devices 130, such as a touch screen LCD, a keypad, etc., which may connect to power processor 104. Input device 130 can allow for the selection of one or more, but not limited to the following: current draw during recharge; current limit during discharge; electrical frequency; fault reset; and control of display 126. In some embodiments, display 126 and input device 130 can be combined into one unit such as a touch screen device.

It should be noted that more, less, or other circuit/logic elements may be utilized and/or one or more circuit/logic elements may be combined in various ways to accomplish one or more features and/or provide the requisite or desired characteristics of power processor 104 as described herein. Additionally, frequency outputs can be modified when large loads are detected (voltage sag) by power processor 104, such as motors from power tools, refrigeration, pumps, etc. Also, power processor 104 may include power line communication over the power output. That is, a high frequency communication signal can be placed on top of, e.g., a 60 Hz (or 50 Hz, 400 Hz or DC power) signal in order to communicate with appliances such as power tools and gardening appliances. The communication can occur in two directions. For example, it may be determined that power processor 104 should reduce power or stop producing power if there is an issue with the appliance (overheated motor, etc.), or the appliance could reduce power or stop if power processor 104 (or one or more aspects/elements thereof) was overheated or battery 102 was in a low-charge status.

As indicated previously, portable power unit 100 may be implemented as/as part of/within a backpack, waist-pack, or other portable unit. Accordingly, in one embodiment, portable power unit 100 may include one or more straps to allow portable power unit 100 to be carried/attached to, for example, a user. Moreover, portable power unit 100 may be enclosed in a sealed, lightweight, non-conductive case made of, e.g., plastic or other non-conductive material.

FIG. 2 illustrates an example configuration in power port 106 for a DC power connection. FIG. 2 illustrates connector pin set 116 (i.e., DC bidirectional pins) and a power cable 136 configured for a DC power connection, as well as a connector 138 for mating power cable 136 to power port 106. The connection of pins T1 and T2 for DC operation can be made in cable 136 or connector 138.

Furthermore, radio transmissions (e.g. Wi-Fi™, cellular, etc.) can be sent from portable power unit 100 to provide communications to, e.g., a user, for indicating status of the portable power unit 100, such as whether the portable power unit 100 is running low on charge, requires recharging, and/or other device usage and/or status updates. Such status updates can include, but are not limited to the following: when portable power unit 100 has sat idle for some period of time without a charge, when it will eventually require recharging, e.g., if a user forgets to recharge portable power unit 100 after using it, etc.

In order to send such communications/status updates, portable power unit 100 may utilize a transmitter, transceiver, radio, modem, or other communications device 140 working in conjunction with at least controller 128. Additionally, a memory unit(s) (not shown) may be implemented in portable power unit 100 for storing and/or providing access to information regarding the aforementioned status updates, idle time, etc. In accordance with one embodiment, communications device 140 may be a WLAN module that can provide wireless communications between portable power unit 100 and a wireless AP, such as the wireless AP 312 shown in FIG. 3, over a wired communication network and/or to a wireless communication network in accordance with various networking protocols such the aforementioned Wi-Fi™ communications standard. The WLAN module can operate as a client to communicate with a wireless AP or as an AP itself to provide communications between other WLAN capable devices and a communication network. The WLAN module may communicate with a mobile core network and/or the Internet, through wireless AP 312, via one or more links and/or associated devices as described in more detail below with regard to FIG. 3, for example. In this manner, the WLAN module may provide network access to portable power unit 100 via wireless AP 312 enabling portable power unit 100 to communicate with, e.g., a user's mobile device, computer, tablet computer, smart phone, cellular phone, etc. that can be running an application or other program/software for receiving and presenting communications/status updates.

Figure 3:
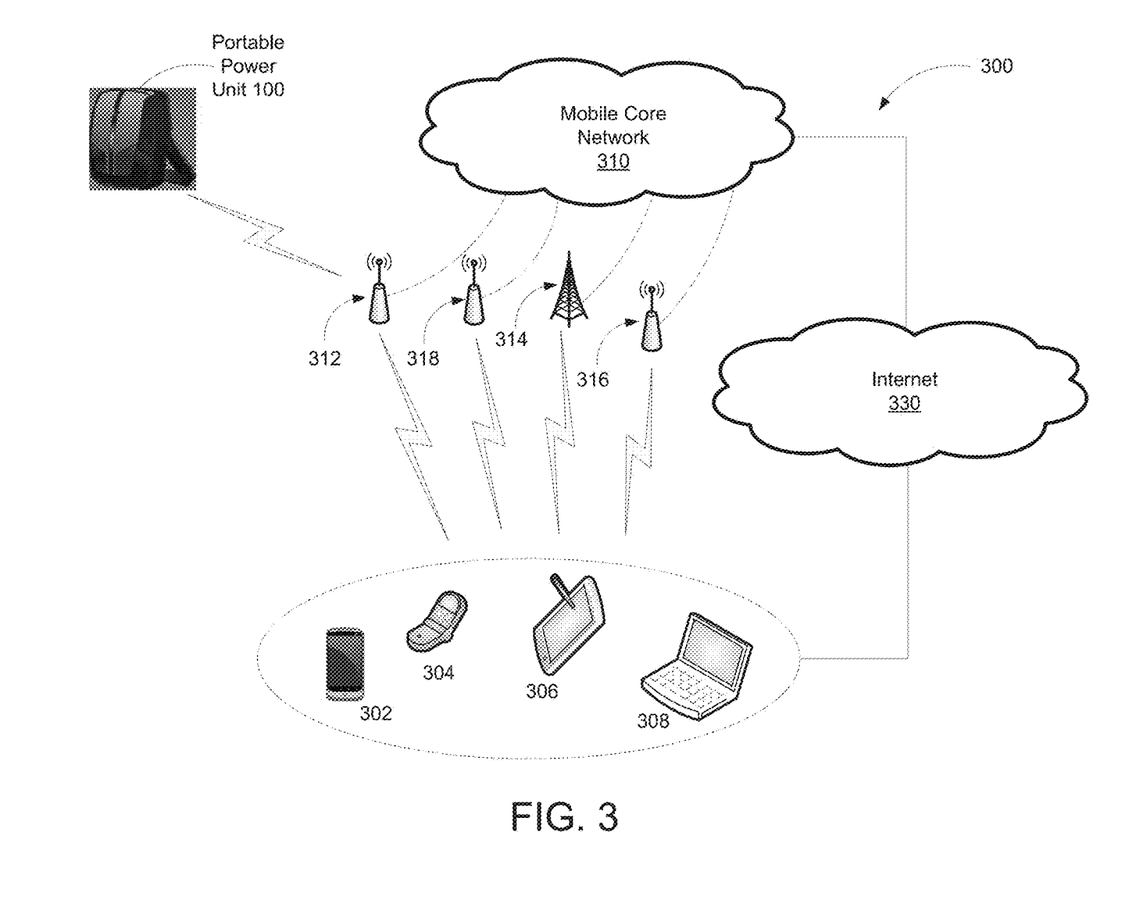
FIG. 3 illustrates an example system in which a portable power unit may communicate a status in accordance with various embodiments.

FIG. 3 is a block diagram illustrating an exemplary communication system in which various embodiments may effectuate communications in accordance with the present disclosure. Referring to FIG. 3, a communication system 300 is illustrated which includes a plurality of mobile devices, of which the mobile devices 302-308 are illustrated. One or more of the illustrated mobile devices 302-308 can include the aforementioned application or applications for receiving and presenting communications and/or status updates. In some embodiments, such an application may allow interaction with portable power unit 100 from/using one of mobile devices 302-308, such as remotely inputting selections in lieu of utilizing input device 130. Exemplary mobile devices may include a smart phone 302, a cellular phone 304, a tablet computer 306, and/or a computer 308. Also shown in communication system 300 is a mobile core network 310, a wireless access point (AP) 312, a cellular base station (BS) 314, a Bluetooth® emitter 316, a Near Field Communication (NFC) terminal 318, and Internet or other data network 330. One or more of mobile core network 310, wireless AP 312, cellular BS 314, Bluetooth® emitter 316, NFC terminal 318, and Internet 330 can be used to provide communications links to mobile devices 302-308 for allowing mobile devices 302-308 to communicate as described herein.

Wireless AP 312 may include suitable logic, circuitry, interfaces, and/or code that are operable to provide data services to communication devices, such as one or more of the mobile devices 302-308, in adherence with one or more wireless LAN (WLAN) standards such as, for example, IEEE 802.11, 802.11a, 802.11b, 802.11d, 802.11e, 802.11n, 802.11 ac, 802.11v, and/or 802.11u. Wireless AP 312 may communicate with mobile core network 310 and/or Internet 330, via one or more links and/or associated devices for example. In this manner, wireless AP 312 may provide network access to mobile devices 302-308. Wireless AP 312 may also communicate with portable power unit 100 and provide portable power unit 100 with the ability to communicate with mobile devices 302-308, via mobile core network 310 and/or Internet 330. As indicated previously, in this manner, portable power unit 100 can provide storage status updates to a mobile device, such as smartphone 302, running an associated status/communications application.

Cellular BS 314 may include suitable logic, circuitry, interfaces, and/or code that are operable to provide voice and/or data services to communication devices, such as one or more of mobile devices 302-308, in adherence with one or more cellular communication standards. Exemplary cellular communication standards may include Global System for Mobile communications (GSM), General Packet Radio Services (GPRS), Universal Mobile Telecommunications System (UMTS), Enhanced Data rates for GSM Evolution (EDGE), Enhanced GPRS (EGPRS), and/or 3GPP Long Term Evolution (LTE). Cellular BS 314 may communicate with mobile core network 310 and/or Internet 330, via one or more backhaul links and/or associated devices for example. In this manner, cellular BS 314 may provide network access to mobile devices 302-308, enabling a mobile device, such as smartphone 302, to communicate with portable power unit 100.

Bluetooth® emitter 316 may include suitable logic, circuitry, interfaces, and/or code that are operable to provide Bluetooth®-based connectivity to communication devices, such as one or more of mobile devices 302-308, in adherence with various Bluetooth® and/or Bluetooth® Low Energy (BLE) standards. Bluetooth® emitter 316 may communicate with mobile core network 310 and/or Internet 330, via one or more backhaul links and/or associated devices for example. In this manner, Bluetooth® emitter 316 may provide network access to mobile devices 302-308, enabling a mobile device, such as smartphone 302, to communicate with portable power unit 100.

NFC terminal 318 may include suitable logic, circuitry, interfaces, and/or code that can provide NFC-based connectivity to communication devices, such as one or more of mobile devices 302-308, in adherence with various short range communication standards such as the Near Field Communications standards. NFC terminal 318 may communicate with mobile core network 310 and/or Internet 330, via one or more backhaul links and/or associated devices for example. In this manner, NFC terminal 318 may provide network access to mobile devices 302-308.

Mobile core network 310 may include suitable logic, circuitry, interfaces, and/or code that are operable to provide interfacing and/or connectivity servicing between access networks, which may be utilized by mobile devices 302-308, and external data networks such as packet data networks (PDNs) and/or Internet 330. Mobile core network 310 may correspond to one or more service providers that provide, control, and/or manage network accessibility available via mobile devices 302-308. In this regard, mobile devices 302-308 may access mobile core network 310 via wireless AP 312, cellular BS 314, Bluetooth® emitter 316, and/or NFC terminal 318. Mobile core network 310 may communicate various data services, which are provided by external data networks, to associated user devices such as, for example, mobile devices 302-308.

Each of mobile devices 302-308 may include suitable logic, circuitry, interfaces, and/or code for implementing various aspects of the embodiments disclosed herein. In this regard, each of mobile devices 302-308 may be operable to communicate via a plurality of wired and/or wireless connections. Each of mobile devices 302-308 may be operable, for example, to transmit to and/or receive signals from one or more of wireless AP 312, cellular BS 314, Bluetooth® emitter 316, NFC terminal 318, and/or Internet 330. Also, each of mobile devices 302-308 may be operable to communicate with, and/or receive services provided by Internet 330 and/or mobile core network 310.

Internet 330 may include a system of interconnected networks and/or devices that enable exchange of information and/or data among a plurality of nodes, based on one or more networking standards, including, for example, Internet Protocol (IP). Internet 330 may enable, for example, connectivity among a plurality of private and public, academic, business, and/or government nodes and/or networks, wherein the physical connectivity may be provided via the Public Switched Telephone Network (PSTN), utilizing copper wires, fiber-optic cables, wireless interfaces, and/or other standards-based interfaces.

As described above, system 300 may enable portable power unit 100 and, e.g., smart phone 302 to communicate over mobile core network 310 or Internet 330, for example, to exchange notifications or messages regarding, e.g., charge status of portable power unit 100 or indications to suggest recharging portable power unit 100.

Figure 4A:
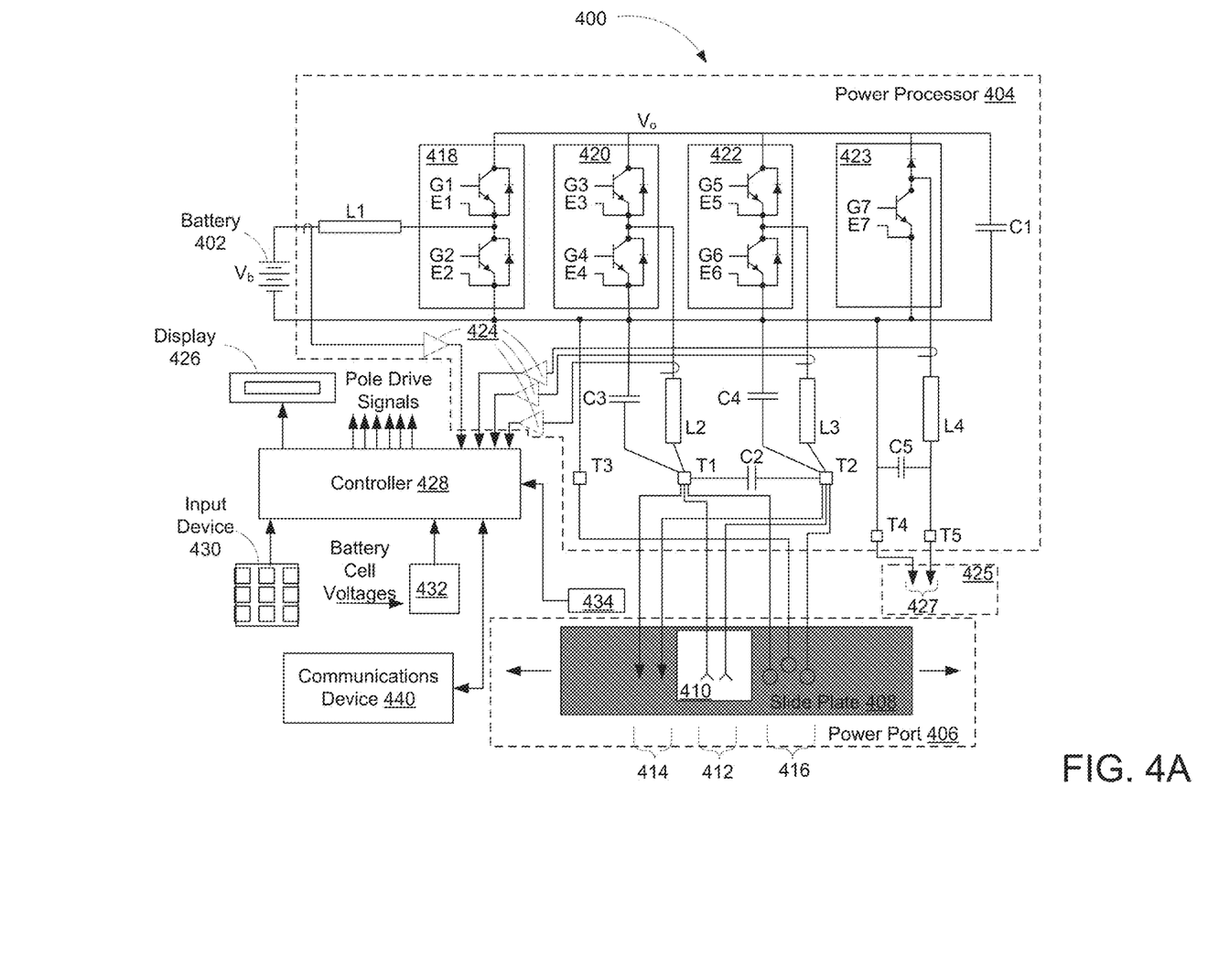
FIG. 4A illustrates another example circuit diagram for implementing a portable power unit in accordance with another embodiment.

FIG. 4A illustrates a circuit diagram of an example portable power unit 400 in accordance with another embodiment. Portable power unit 400 of FIG. 4A is similar to portable power unit 100 of FIG. 1, where like reference numerals indicate like/corresponding elements in FIGS. 1 and 4A. However, portable power unit 400 may include an additional power pole 423 implemented in power processor 404. Power pole 423 may allow simultaneous charging of battery 402 while power poles 420 and 422 provide AC or DC power, power pole 423 acting in boost mode. This can useful in situations where DC power is available, and battery 402 can be charged via, e.g., an automobile (12VDC power fed in through power pole 423), while the user simultaneously operates AC or DC loads. This DC charging can be fed from a dedicated power port 425 (separate from power port 406, and including male connector pins 427).

Power pole 423 can include a single transistor (whether BJT, IGBT, MOSFET, etc.), with a diode connected to the collector of the transistor. A fourth inductor L4 connects the collector of power pole 423 to terminal T5 of dedicated power port 425. A fifth capacitor C5 is connected between T4 and T5 of dedicated power port 425. Current sensing can be accomplished via another one of current sensors 424 connected between power processor 404 and controller 428.

Figure 4B:
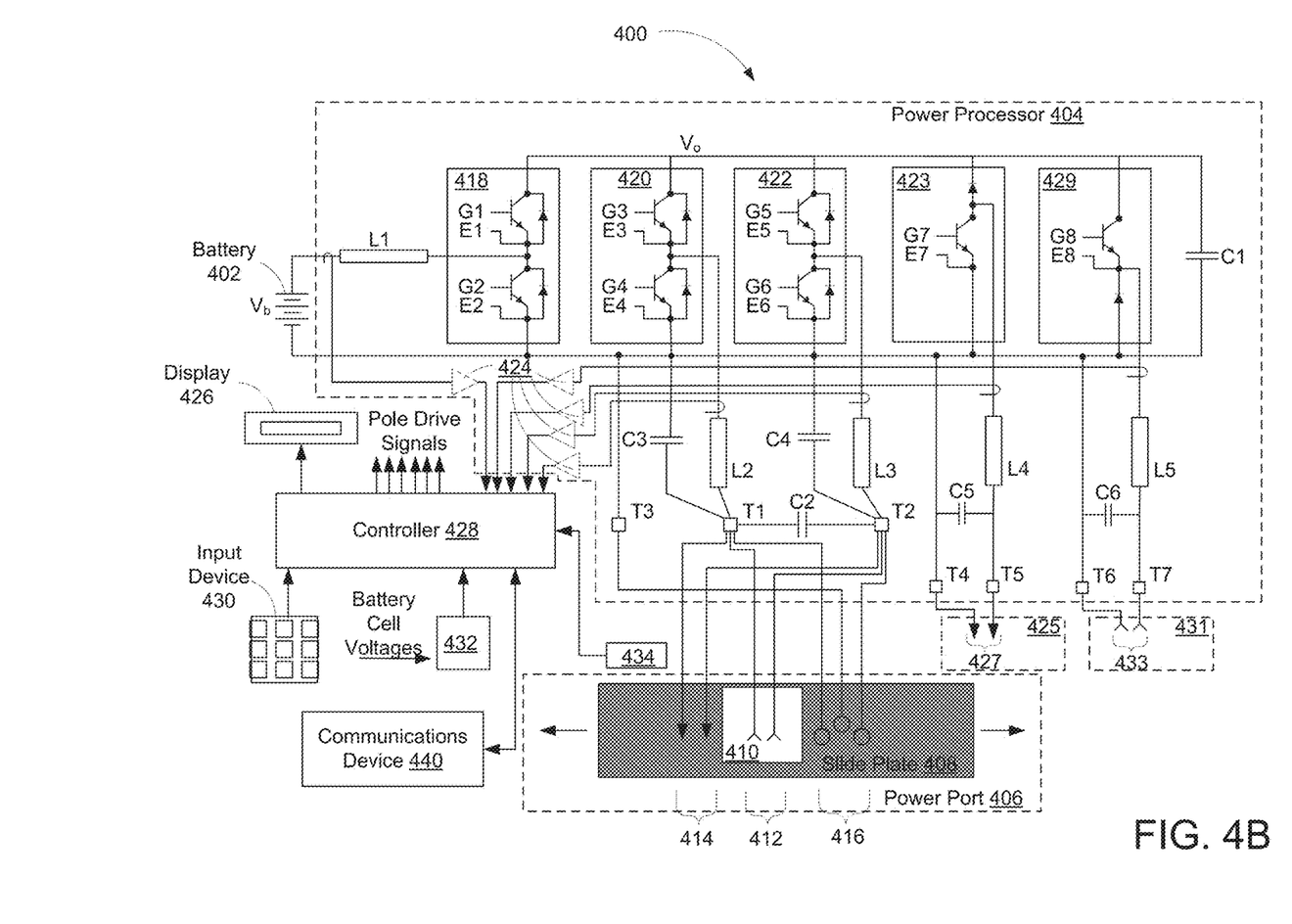
FIG. 4B illustrates still another example circuit diagram for implementing a portable power unit in accordance with another embodiment.

FIG. 4B illustrates a circuit diagram of example portable power unit 400 in accordance with still another embodiment. Again, portable power unit 400 of FIG. 4B is similar to portable power unit 100 of FIG. 1, where like reference numerals indicate like/corresponding elements in FIGS. 1 and 4B. However, portable power unit 400 may include yet another power pole 429 implemented in power processor 404. With additional power pole 429 (which can be a single transistor and diode connected to the emitter of the single transistor) operating in buck mode, portable power unit 400 can be used for providing another dedicated DC supply (power port 431 which can include female connector pins 433, separate from power port 406). This arrangement can be used for dedicated loads to charge, e.g. small appliances (e.g., acting as a 5V USB supply for charging cellular phones).

As alluded to previously, features and/or applicable circuit/logic design associated with such features discussed in accordance with various embodiments may be combined in any number of ways to achieve a portable power unit having configurable capabilities/features. For example, in accordance with another alternative embodiment, power processor 404 may include power poles 418, 402, and 422 for implementing the aforementioned AC/DC charging/recharging as well as power pole 429 for implementing small appliance charging.

Figure 5:
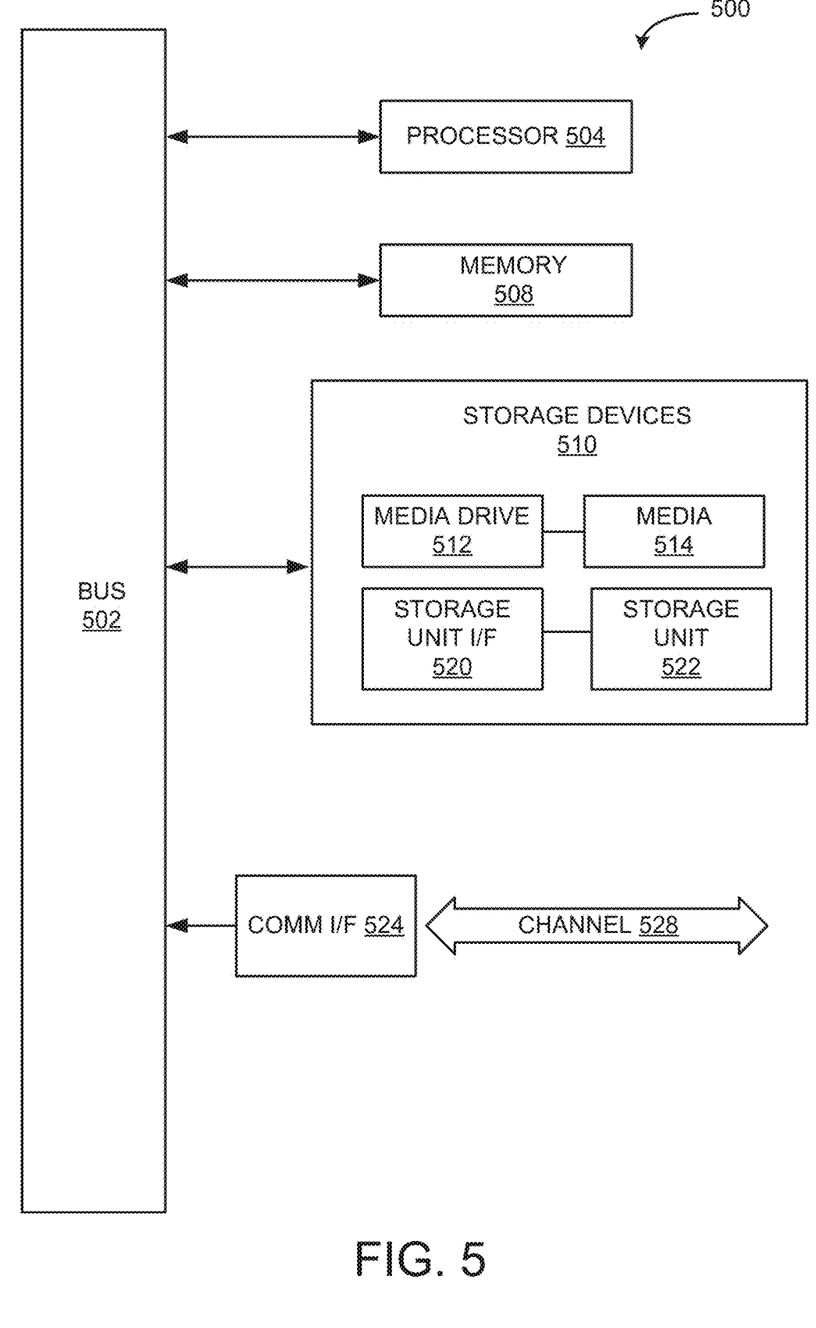
FIG. 5 illustrates an example computing module that may be used in implementing various features of embodiments.

FIG. 5 illustrates an example computing module, an example of which may be controller 128 of portable power unit 100 or controller 428 of portable power unit 400, that may be used to implement various features of the system and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 5. Various embodiments are described in terms of this example-computing module 500. After reading this description, it will become apparent to a person skilled in the relevant art how to implement the application using other computing modules or architectures.

Referring now to FIG. 5, computing module 500 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A portable power unit, comprising:
   an electrochemical battery; and
   a bidirectional power processor configured to provide direct current (DC) power exchange between the electrochemical battery and the bidirectional power processor and a user selectable alternating current (AC) or DC power exchange between the bidirectional power processor and at least three separate power ports, the bidirectional power processor comprising a controller and a plurality of switching poles, each one of the plurality of the switching poles connected in parallel with the electrochemical battery;
   wherein the at least three separate power ports comprise a first power port providing connections through which a power source or a first external load can be connected for simultaneous charging and discharging of the electrochemical battery, respectively, a second power port providing connections through which a second external load can be connected, and a third power port providing connections through which the electrochemical battery can be charged simultaneously with providing power to at least one of the first external load and the second external load;
   wherein the bidirectional power processor is further configured to modify frequency output upon detecting a large external load by temporarily lowering the frequency output.

2. The portable power unit of claim 1, further comprising a battery management circuit adapted to control the bidirectional power processor such that no cell within the electrochemical battery is charged to a voltage exceeding or below a selected threshold; and
   wherein the battery management circuit further balances each cell in the electrochemical battery and protects the electrochemical battery from exceeding an operating temperature threshold.

3. The portable power unit of claim 1, further comprising:
   a display connected to the bidirectional power processor for providing at least one of a battery charge state, a battery health state, a mode of operation of the portable power unit, power port voltage, power port current, power port frequency, and fault diagnostics; and
   an input device connected to the bidirectional power processor to allow selection of one or more of current draw during recharge, current limit during discharge, electrical frequency, fault reset, and control of the display.

4. The portable power unit of claim 1, further comprising a communications device for communicating at least one of a plurality of portable power unit status messages to a user;
   wherein the at least one of the plurality of portable power unit status messages comprises a message that the portable power unit is running low on charge, a message that the portable power unit requires recharging, and a message associated with at least status update regarding the portable power unit.

5. The portable power unit of claim 1, further comprising a separate 12V charging unit adapted to allow simultaneous DC charging of the portable power unit and AC or DC output to the first external load.

6. The portable power unit of claim 1, wherein the bidirectional power processor provides power line communication over power output, such that a high frequency communication signal is placed on top of either DC power or AC power generated.

7. The portable power unit of claim 6, wherein the power line communication comprises one of an instruction to the bidirectional power processor to one of reduce power or stop producing power when an issue with the first external load arises, and an instruction to the first external load to reduce power or stop its operation when one of the bidirectional power processor becomes overheated or the electrochemical battery is in a low charge state.

8. The portable power unit of claim 1, further comprising a first capacitor connected in parallel with the electrochemical battery.

9. The portable power unit of claim 8, further comprising:
a first inductor connected between one side of the electrochemical battery and a phase node of a first switching pole of the plurality of switching poles;
a second inductor connected between a phase node of a second switching pole of the plurality of switching poles and a first terminal of the power port; and
a third inductor connected between a phase node of a third switching pole of the plurality of switching poles and a second terminal of the power port.

10. The portable power unit of claim 8, further comprising:
a second capacitor connected between first and second terminals of the power port;
a third capacitor connected between a first terminal of the power port and one side of the electrochemical battery; and
a fourth capacitor connected between a second terminal of the power port and one side of the electrochemical battery.

11. The portable power unit of claim 8, further comprising a first terminal of the power port directly connected to one side of the electrochemical battery.

12. The portable power unit of claim 1, wherein each of the at least three power ports comprises at least three sets of connector pins, a first set of connector pins configured to receive AC utility power, a second set of connector pins configured as an AC power outlet for the external load, and a third set of connector pins configured for bidirectional DC power exchange;
wherein the third set of connector pins comprises three connector pins connected to first, second, and third terminals of the power port;
wherein the third set of connector pins mates with a three pin connector, first and second pins of the three pin connector being connected; and
wherein currents at each of the at least three power ports the power port are limited by the bidirectional power processor.

13. The portable power unit of claim 12, wherein each of the at least three power ports further includes a moving cover plate for exposing only one set of the at least three sets of connector pins at a time such that only one mating connector can be mated with each of the at least three power ports at one time; and
wherein the moving cover plate includes at least one sensor which detects a position of the moving cover plate and provides command signals to the bidirectional power processor for implementing any of a plurality of operation modes including an AC recharge mode, a DC recharge mode, an AC discharge mode, and a DC discharge mode.

14. The portable power unit of claim 13, wherein a voltage-regulated sine wave is applied to first and second terminals of each of the at least three power ports when the moving cover plate exposes the second set of connector pins upon either a user requesting AC voltage via at least one of an input device and display or when a plug is mated with the second set of connector pins.

15. The portable power unit of claim 13, wherein recharge current is applied to terminals of the electrochemical battery when AC utility power is applied to first and second terminals of each of the at least three power ports, and when a socket connector is mated to the first set of connector pins; and
wherein current at each of the at least three power ports comprises a sine wave in phase with an applied utility voltage.

16. The portable power unit of claim 13, wherein a regulated DC voltage is applied to first and third terminals of each of the at least three power ports when a corresponding plug is mated with the third set of connector pins, and wherein DC current is twice as large as AC current when the first terminal of the power port and a second terminal of each of the at least three power ports are connected with a shorting connector.

17. The portable power unit of claim 13, wherein a recharge current is applied to the electrochemical battery when DC power is applied to first and third terminals of each of the at least three power ports when a corresponding connector is mated to the third set of connector pins, and wherein DC current is twice as large as AC current when the first terminal of each of the at least three power ports and a second terminal of each of the at least three power ports are connected with a shorting connector.

18. A portable power unit, comprising:
an electrochemical battery; and
a bidirectional power processor configured to provide direct current (DC) power exchange between the electrochemical battery and the bidirectional power processor and a user selectable alternating current (AC) or DC power exchange between the bidirectional power processor and at least two separate power ports, the bidirectional power processor comprising a controller and a plurality of switching poles, each connected in parallel with the electrochemical battery;
wherein the at least two separate power ports comprise a first power port providing connections through which a power source or a first external load can be connected for simultaneous charging and discharging of the electrochemical battery, respectively, and a second power port providing connections through which a second external load can be connected; and
wherein the bidirectional power processor is further configured to modify frequency output upon detecting a large external load by temporarily lowering the frequency output.

19. A portable power unit, comprising:
an electrochemical battery; and
a bidirectional power processor configured to provide direct current (DC) power exchange between the electrochemical battery and the bidirectional power processor and a user selectable alternating current (AC) or DC power exchange between the bidirectional power processor and at least three separate power ports, the bidirectional power processor comprising a controller and a plurality of switching poles, each connected in parallel with the electrochemical battery;

wherein the at least three separate power ports comprise a first power port providing connections through which a power source or a first external load can be connected for simultaneous charging and discharging of the electrochemical battery, respectively, a second power port providing connections through which a second external load can be connected, and a third power port providing connections through which the electrochemical battery can be charged simultaneously with providing power to at least one of the first external load and the second external load; and wherein the bidirectional power processor is further configured to modify frequency output upon detecting a large external load by temporarily lowering the frequency output.

* * * * *